(12) United States Patent
Sciammarella et al.

(10) Patent No.: US 6,554,434 B2
(45) Date of Patent: Apr. 29, 2003

(54) INTERACTIVE PROJECTION SYSTEM

(75) Inventors: Eduardo A. Sciammarella, Tokyo (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/900,367

(22) Filed: Jul. 6, 2001

(65) Prior Publication Data

US 2003/0007135 A1 Jan. 9, 2003

(51) Int. Cl.[7] ............................................. G03B 21/28
(52) U.S. Cl. .............................. 353/98; 353/42; 353/28
(58) Field of Search ............................. 353/28, 69, 11, 353/42, 44, 45, 50, 70, 98, 62, 74, 77, 122; 352/69, 70

(56) References Cited

U.S. PATENT DOCUMENTS

| | | | | |
|---|---|---|---|---|
| 4,468,694 A | * | 8/1984 | Edgar | 348/135 |
| 5,114,224 A | * | 5/1992 | Miyamoto et al. | 353/122 |
| 6,062,693 A | * | 5/2000 | Sato | 353/10 |
| 6,293,677 B1 | * | 9/2001 | Gallucci | 353/28 |
| 6,317,118 B1 | * | 11/2001 | Yoneno | 345/156 |
| 6,388,810 B1 | * | 5/2002 | Monson et al. | 353/51 |
| 6,394,610 B2 | * | 5/2002 | Rodriguez, Jr. | 353/119 |
| 6,409,351 B1 | * | 6/2002 | Ligon | 353/98 |
| 6,431,711 B1 | * | 8/2002 | Pinhanez | 353/69 |

* cited by examiner

Primary Examiner—Russell Adams
Assistant Examiner—Andrew Sever
(74) Attorney, Agent, or Firm—Frommer Lawrence & Haug LLP; William S. Frommer; Matthew K. Ryan

(57) ABSTRACT

An interactive projection system for displaying an image on a planar surface includes a base, a projector, a convex mirror, and at least one support. The base is disposed on the planer surface. The projector is housed in the base. The projector has an image projecting portion that projects an image along a projection path away from the projector. The at least one support is connected to the base and supports the convex mirror at a position along the projection path so as to face the image projecting portion of the projector and the planar surface.

13 Claims, 11 Drawing Sheets

INTERACTIVE PROJECTION SYSTEM

BACKGROUND OF THE INVENTION

1. Field of the Invention

The present invention relates to computer displays, interactive displays, input and output methods for computers, and particularly to interactive projection systems.

2. Description of the Related Art

Computers typically include a display for displaying information, and a keyboard and a mouse to enable a user to interact with the computer based on the displayed information. However, this type of computer is adapted mainly for personal use and is unsatisfactory for group usage.

Recently, interactive projection systems have been developed for projecting images on a table top for meetings, presentations, and the like. One conventional projection system includes a projector disposed underneath a transparent table top. The projector projects images onto the under surface or the table top so that the images are visible to people sitting around the table. Another conventional system has a projector that projects an image onto a mirror that is mounted on the ceiling above the projector. The image is reflected off the mirror back onto the table top where users view the image. A third conventional system includes a transparent table top and a mirror installed on the ceiling above the table top. A projector projects an image through the table top toward the mirror, which reflects the image back onto the table top.

SUMMARY OF THE INVENTION

However, these projection systems require special furniture or are difficult to install and transport. For example, the first system requires a special transparent table. The other system requires that a projector and mirror be installed at appropriate positions to project images on the table. The user cannot move the table without having to reinstall the projector and the mirror. The third conventional system Includes all of these problems.

It is an objective of the present invention to provide an interactive projection that has only a minimum of required components, that does not require special installation, and that can be easily moved around.

To achieve the above-described objectives, an interactive projection system according to the present invention for displaying an image on a planar surface includes a base, a projector, a convex mirror, and at least one support. The base is disposed on the planer surface. The projector is housed in the base. The projector has an image projecting portion that projects an image along a projection path away from the projector. The at least one support is connected to the base and supports the convex mirror at a position along the projection path so as to face the image projecting portion of the projector and the planar surface.

With this configuration, the at least one support supports the convex mirror so there is no need to mount the convex mirror onto the ceiling above the system. Because the mirror is convex, the image is reflected onto a broader area of the planar surface than if the mirror were flat. Therefore, a large displayed image can be achieved with a relatively small mirror disposed relatively close to the base. The system can be produced in a more compact size.

It Is desirable to further provide a position indicator, a camera, and a processor to the system. The position indicator is for indicating a position on the planar surface. The camera detects the position indicated by the position indicator. The processor is for determining positional relationship of the position indicated by the position indicator and the displayed image on the planar surface, and controlling the projector to include a cursor in the image at the position indicated by the position indicator. With this configuration, the position indicator can be used as a mouse, in that the cursor is displayed depending on the position indicated by the position indicator.

According to one aspect of the invention, the convex mirror is shaped in a ¼ wedge of a circle am viewed from the image projecting portion. With this configuration, less support is required compared to the case if the convex mirror were shaped like a full circle. When the convex mirror is shaped in a ¼ wedge of a circle as viewed from the image projecting portion, then the camera can be mounted on the base or on the convex mirror. When the camera is mounted on the base, its image-pick-up portion faces the convex mirror so that the camera detects the position indicated by the position indicator as reflected from the convex mirror. This configuration is desirable because even less support is required to support the convex mirror. When the camera is mounted on the convex mirror, its image-pick-up portion faces the displayed image on the planar surface so that the camera detects the position indicated by the position indicator by viewing the displayed image. This configuration is desirable because the camera detects the position indicated by the position indicator directly, thereby avoiding possible distortion by the mirror.

The convex mirror can be shaped substantially like a torus with a center hole as viewed from the image projecting portion. This configuration is desirable because the convex mirror reflects the image in a torus shape around the base. In this case, it is desirable to orient the camera so that its image-pick-up portion faces the image projection portion or the projector through the center hole of the convex mirror. The system can be more compact. Also in this case, it is desirable that the projector project a torus shaped image with objects and concentric rings, wherein objects on concentric rings nearer a center portion and perimeter edge of the torus image being displayed larger than objects aligned on concentric rings positioned substantially between the center portion and perimeter edge of the torus image. With this configuration, a great many objects can be displayed by positioning them nearer the center portion and the perimeter edge.

It is desirable that the position indicator include an infrared emitter for emitting infrared light to indicate the position and an infrared lens covering the image-pick-up portion of the camera. In this way, the position indicator can be realized by a simple configuration. Also, the infrared filter filters out light of the projected image, so the camera can detect the position of the position indicator without interference from the light of the projected image.

When plural supports are disposed substantially equidistance from each other external from the convex mirror, the image reflected from the projection path off the convex mirror is blocked to produce shadows in the image displayed on the planar surface. These shadows can be used to enhance functionality of the displayed image. For example, the processor can control the projector to display an opening door in the image when the processor determines that the position indicator is moved from a position on one of the shadows to a position away from the shadow, and control the projector to display objects within the door. With this configuration, the door can serve in the manner of a pop-up menu or tool bar. Also, two adjacent shadows can be used to define a networked area within the displayed image.

According to another aspect of the invention, an infrared emitting unit, at least one infrared sensor, and a processor are further provided. The infrared emitting unit is for emitting infrared light in a plurality of patterns. The at least one infrared sensor is for detecting the infrared light emitted by the infrared light emitting unit. The processor is for determining light pattern of the infrared light detected by the infrared sensor and for performing a process that corresponds to the light pattern. With this configuration, the infrared emitting unit can serve as a mouse for sending commands to the processor.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENT

Figure 1:
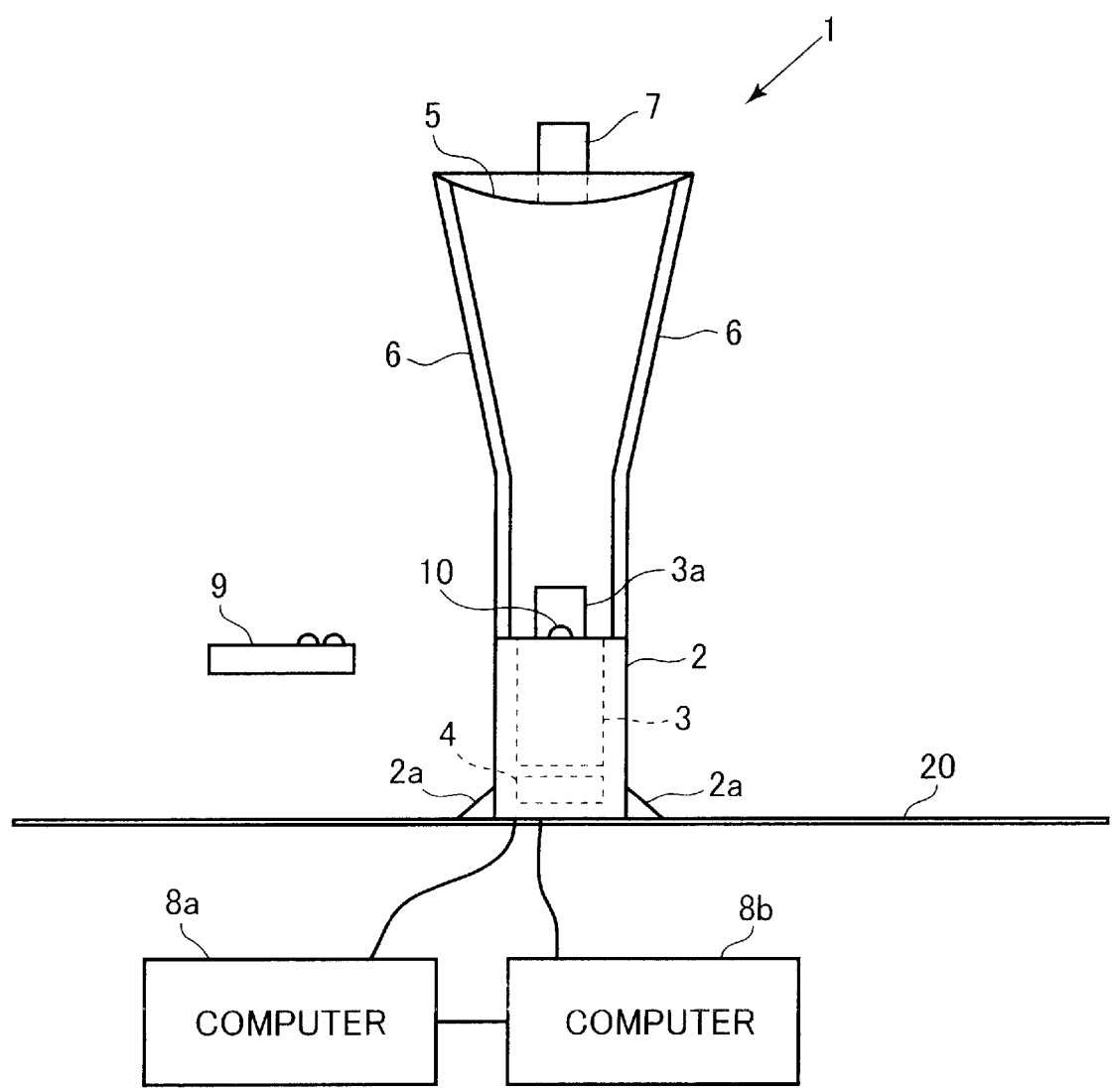
FIG. 1 is a side view showing an interactive projection system according to an embodiment of the present invention.

Next, an interactive projection system 1 according to an embodiment of the present invention will be described while referring to the attached drawings. As shown in FIG. 1, the system 1 includes a base 2 housing a projector 3 and a fan 4, a convex mirror 5, supports 6, a camera 7, computers 8a and 8b, an infrared pen 9, and infrared readers 10. The system 1 is used with the base 2 set on a planar surface 20.

Figure 2:
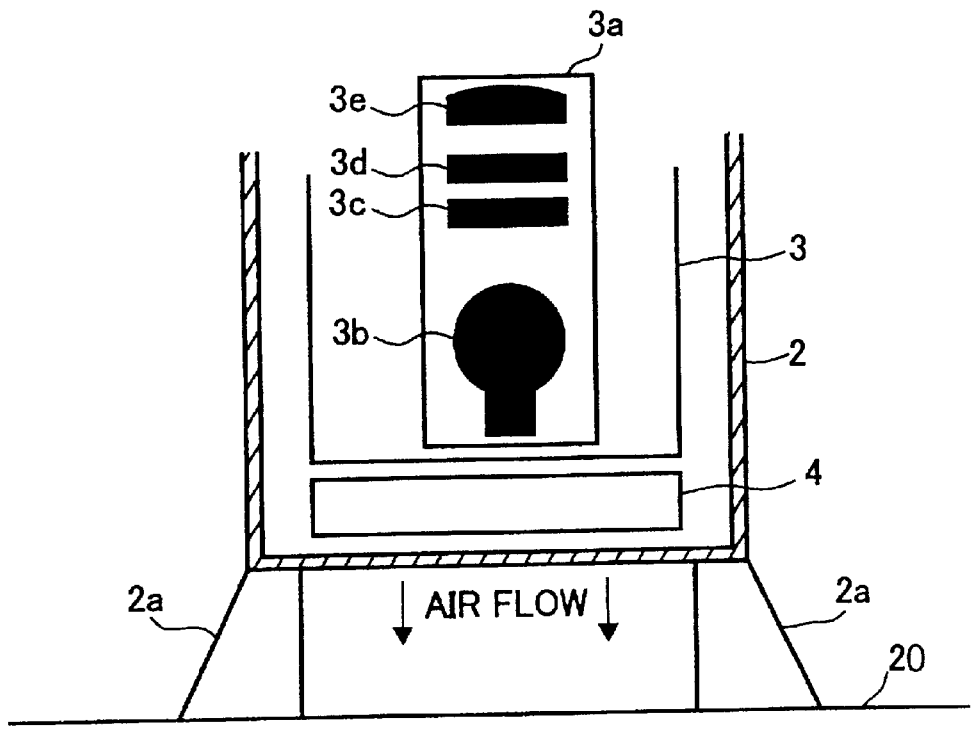
FIG. 2 is a cross-sectional view showing internal configuration of a base portion of the system of FIG. 1.
Figure 3:
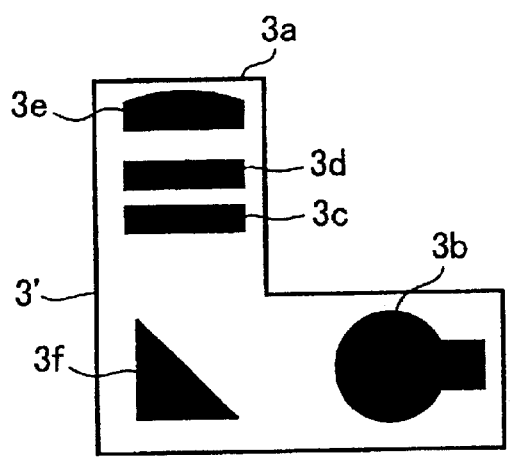
FIG. 3 is a cross-sectional view showing an alternative projector arrangement.

As shown in FIG. 2, the base 2 includes feet 2a to slightly elevate the base 2 above the planar surface 20 to allow the fan 4 to circulate air from the bottom of the base 2. The projector 3 includes an image projecting portion 3a, a lamp 3b, a color wheel 3c, a micro display 3d, and a lens 3e. According to the present embodiment, the optical components of the projector 3 are aligned in a straight line to insure the smallest possible footprint. However, the optical components could be disposed in an L-shaped configuration as shown in FIG. 3.

Figure 4:
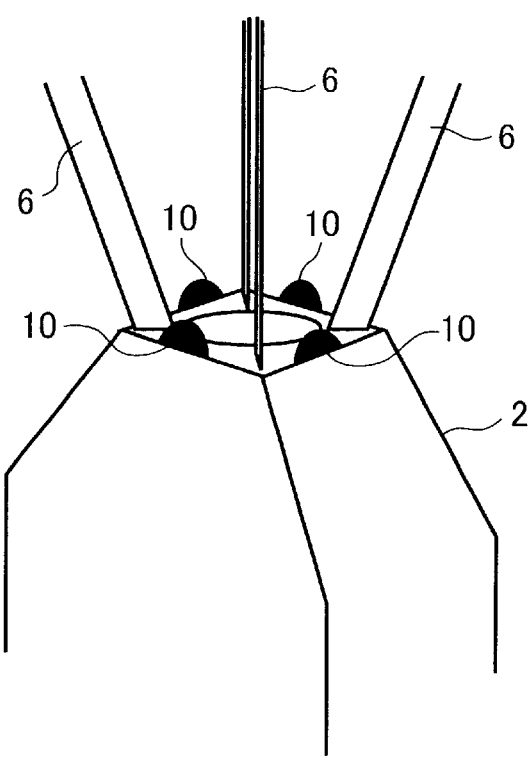
FIG. 4 is a partial view showing the top portion of the base.

As shown in FIG. 4, four supports 6 are connected to the upper end of the base 2. Four infrared readers 10 are mounted on the four upper edges of the base 2, one infrared reader 10 being mounted between each adjacent pair of supports 6.

Figure 5:
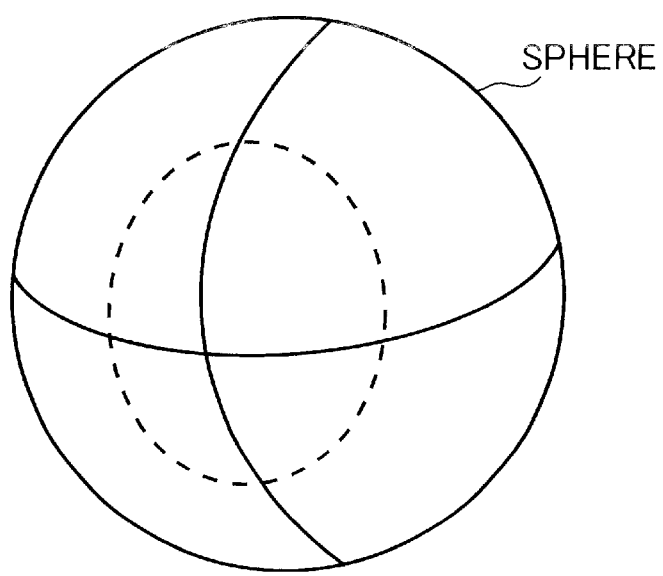
FIG. 5 is a schematic view showing that a convex mirror of the system is a portion of a sphere.
Figure 6:
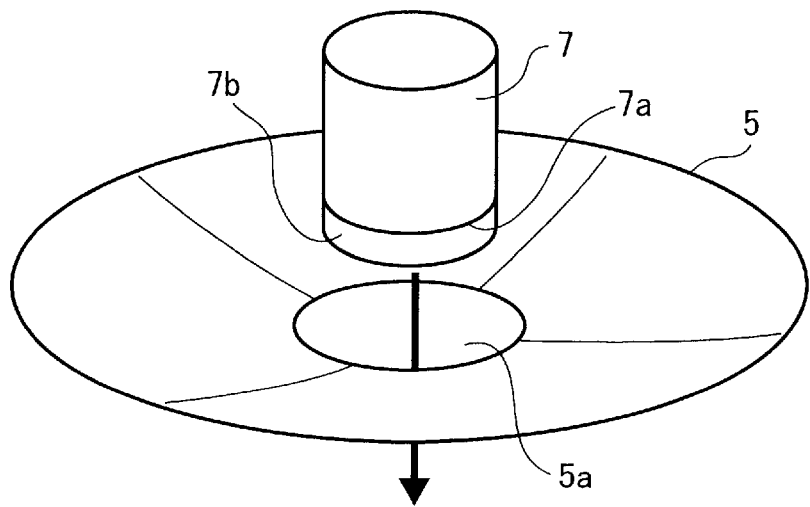
FIG. 6 is a partial perspective view showing position of a camera with respect to the convex mirror.

Returning to FIG. 1, the convex mirror 5 is supported by the upper ends of the supports 6. The convex mirror 5 is a circular section of a sphere as shown in FIG. 5. As shown in FIG. 6, the convex mirror 5 is formed with a center hole 5a. As a result, the convex mirror 5 appears substantially like a torus when viewed from the image projecting portion 3a.

The camera 7 has an image-pick-up portion 7a. The camera 7 is disposed above the mirror 7 with the image-pickup portion 7a facing the image projection portion 3a of the projector 3 through the center hole 5a of the convex mirror 5. A filter 7b that allows only infrared light to pass through covers the image-pick-up portion 7a of the camera 7.

Figure 7A:
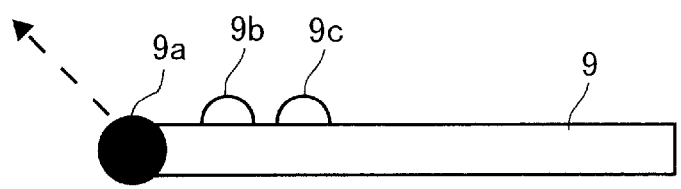
FIG. 7(a) is a side view showing a pen of the system with no buttons pressed.
Figure 7B:
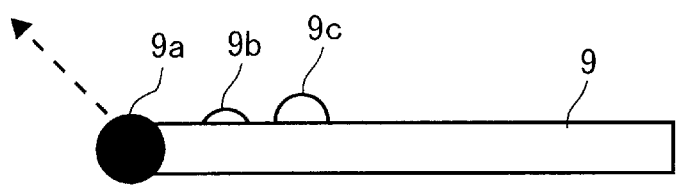
FIG. 7(b) is a side view showing the pen with one button pressed.
Figure 7C:
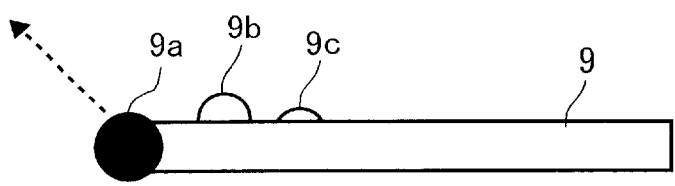
FIG. 7(c) is a side view showing the pen with another button pressed.

As shown in FIG. 7(a), the pen 9 includes an infrared emitter 9a and buttons 9b, 9c. The infrared emitter 9a constantly emits infrared light. The buttons 9b, 9c change the pattern of infrared light emitted by the infrared emitter 9a to allow the user to send commands to the computers 8a, 8b in the manner of a mouse. As shown in FIG. 7(a) the infrared emitter 9a emits a certain infrared light pattern as long as neither of the buttons 9b, 9c is pressed. However, as shown in FIGS. 7(b) and (c), the infrared emitter 9a emits different infrared light patterns when the buttons 9b, 9c are pressed.

Figure 8:
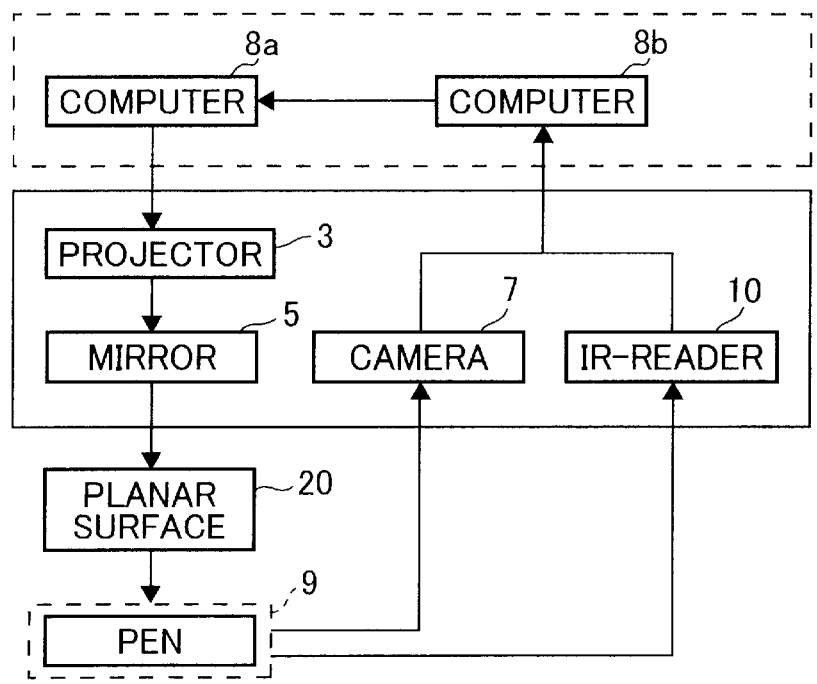
FIG. 8 is a block diagram showing components of the system.
Figure 9:
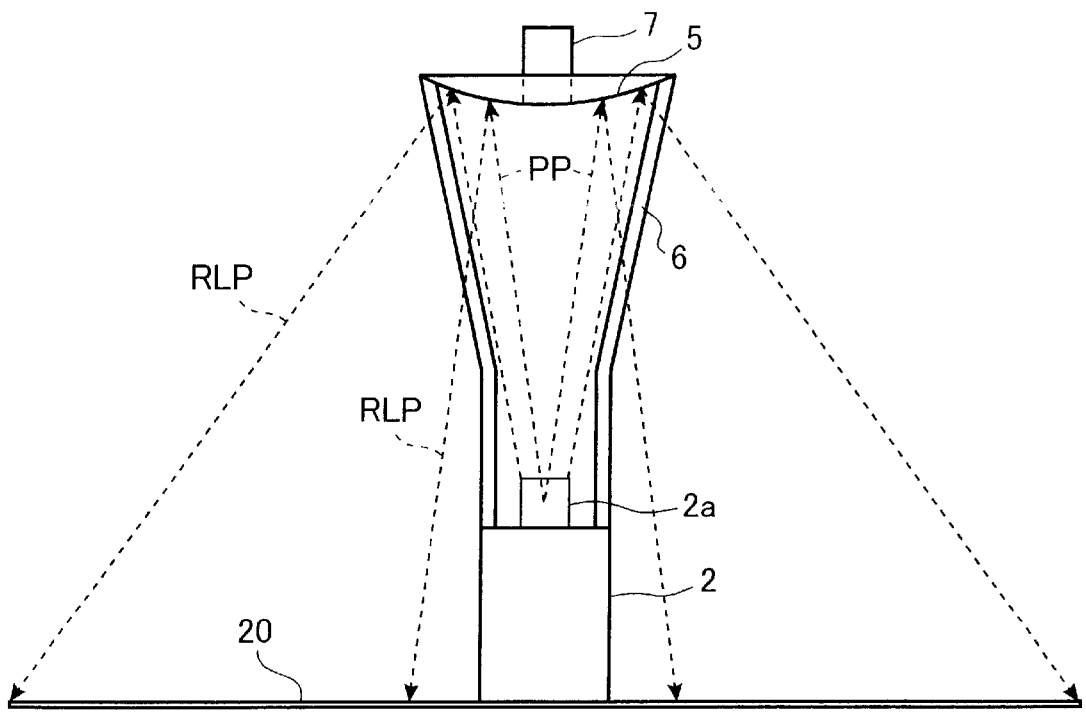
FIG. 9 is a side view showing the system projecting an image onto a planar surface.
Figure 10:
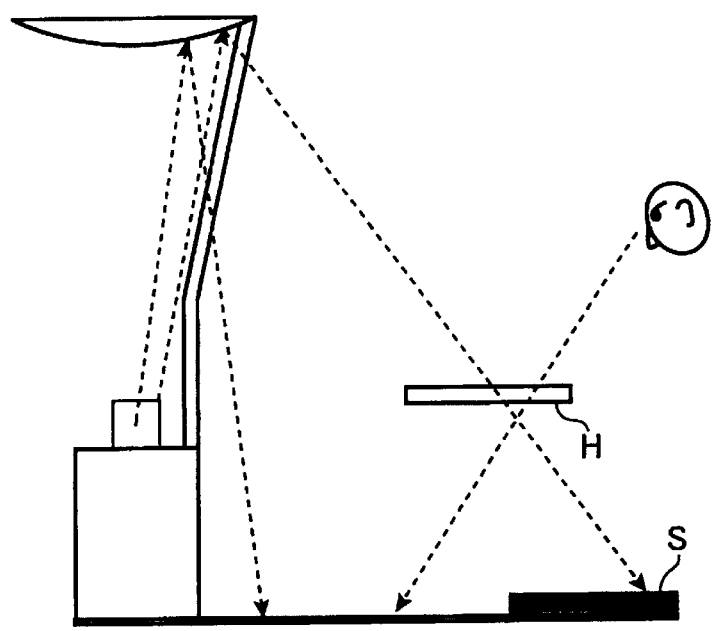
FIG. 10 is a side view showing position of a shadow produced by a user's hand interfering with the projected image.

FIG. 8 is a block diagram showing overall system configuration. The computer 8a runs program software and sends a red, green, and blue (RGB) video signal to the projector 3 accordingly. The projector 3 receives the RGB video signal and, as shown in FIG. 9, projects an image from the image projecting portion 2a to travel perpendicular and away from the planar surface 20 along a projection path PP toward the convex mirror 5. The convex mirror 5 reflects the video image from the projector 3 back towards the planar surface 20 following a reflected light path RLP. The video image is displayed on the planar surface 20 for the user to see. Because the mirror 5 is convex, the mirror 5 reflects a much larger image than a flat mirror would. Therefore, the system 1 is compact. Also, as shown in FIG. 10, because the projected image is reflected from the center to the edges of planar surface, there is less of a problem with the shadow S of the user's hand H and the like obscuring the user's view of the projected lamp.

Figure 11:
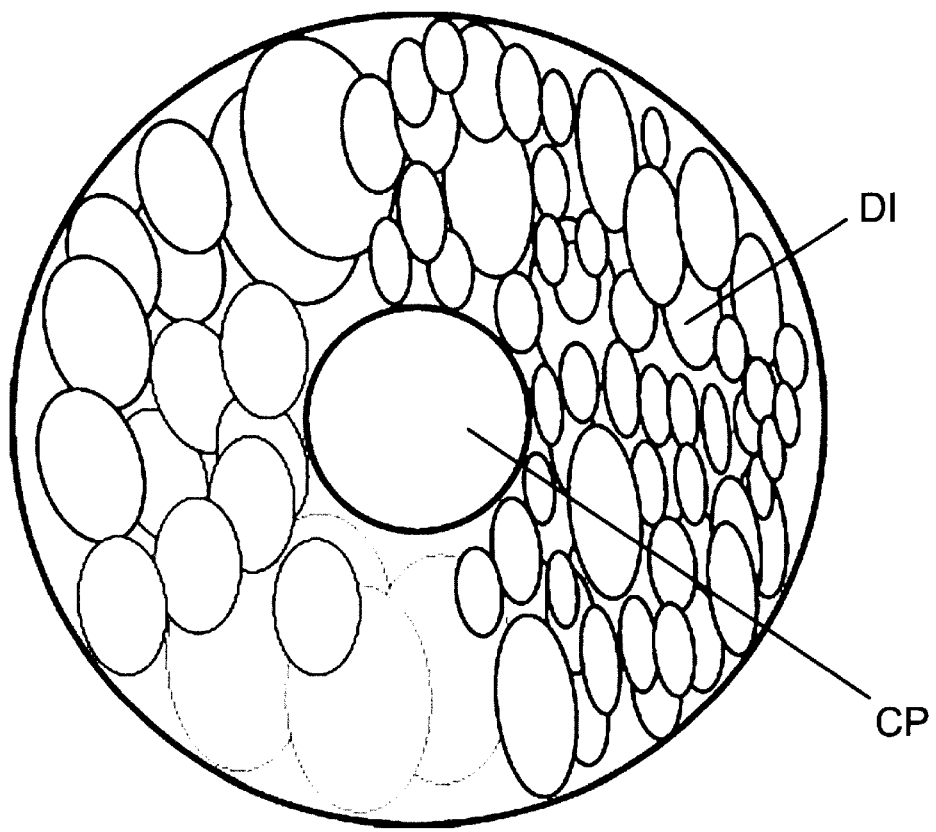
FIG. 11 is a plan view showing the image projected on the planar surface.
Figure 12:
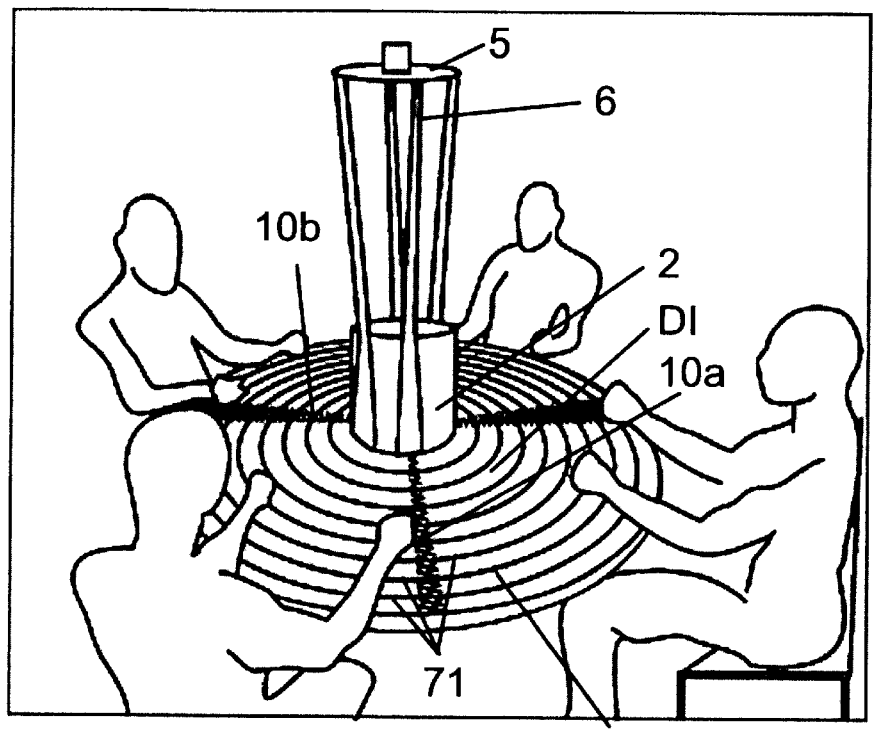
FIG. 12 is a perspective view showing the system used to project an image on a conference table.

As shown in FIG. 11, the displayed image DI appearing on the planar surface 20 is a circular torus. The base 2 is located at the center portion CP of the torus. Because the displayed image DI is circular, as shown in FIG. 12 the system 1 is well suited for placement on a table top, such as in a social or public context, in a school or office. In this case, the table top serves as the planar surface 20.

Figure 13:
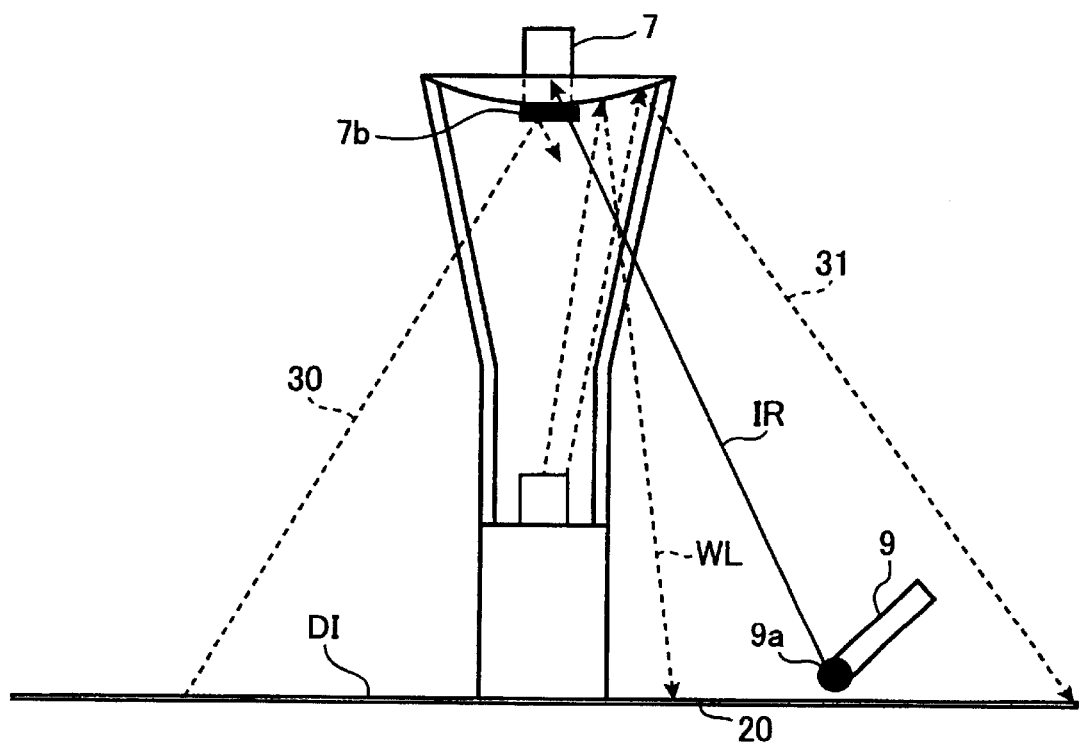
FIG. 13 is a side view showing infrared light from the pen passing through an infrared filter into the camera.

The camera serves as the "eye" of the system 1. The image-pick-up portion 7a of the camera 7 includes a wide-angle lens that enables the camera 7 to "see" the entire area of displayed image DI. The camera 7 constantly detects and tracks the position of the infrared emitter 9a using the emitted light, regardless of the pattern, as long as there is light being emitted. As shown in FIG. 13, only infrared light IR passes through the filter 7b to the camera lens, light 30 from the displayed image DI and light 31 from the projected image can be prevented from interfering with detection of the infrared light IR from the pen 9. Further, the system 1 projects images with the center portion unused, that is, black. Because the camera 7 is located at the black center of the projected image, little light from the projector 3 falls incident on the image-pick-up portion 7a of the camera 7, although the camera 7 is directly in the projection path or the protector 3. This gives the camera 7 an unobstructed view of the displayed image DI on the planar surface 20. The camera 7 transfers the video image to the computer 8b.

Figure 14:
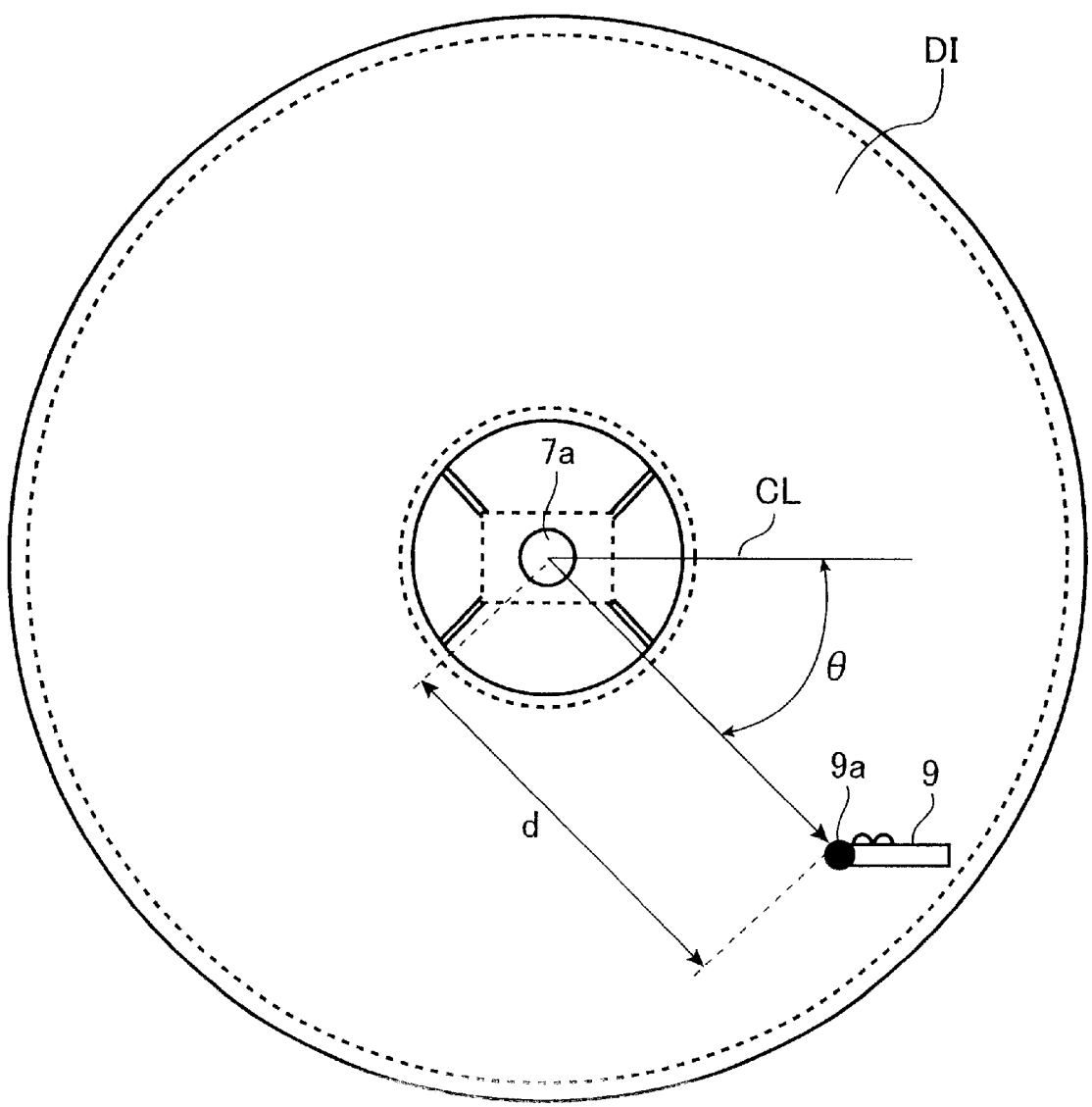
FIG. 14 is a plan view showing how the system determines the position of the pen based on distance and angle.

The computer 8b receives video data from the camera 7 and command data from the infrared readers 10. The computer 8b executes software that analyzes the video image from the camera 7 to, as shown in FIG. 14, determine distance d of the infrared light emitter 9a from the center of the image-pick-up portion 3a and angle θ with respect to a center line CL. The computer 8b uses the distance d and angle θ to determine X, Y coordinates for the emitter 9a on a rectilinear coordinate system that corresponds to the area of the displayed image DI. To accomplish this, the computer 8b uses the following formulas:

$$X = r \cos \theta$$

$$Y = r \sin \theta$$

wherein r is the distance d from point (x, y) to the origin (0, 0).

In this way, the computer 8b determines the location of the pen 9 on the planar surface 20 and sends this information to the computer 8a. The computer 8a controls the projector to project a cursor at the location of the pen 9. As the pen 9 is moved around the planar surface 10, the projector 3 projects the cursor to follow the movements of the pen 9.

When one of the buttons 9b, 9c on the pen 9 is pressed, the infrared emitter 9a emits infrared light with the corresponding pattern. One of the infrared readers 10 picks up the infrared light and sends a corresponding coded signal to the computer 8b. The computer 8b sends the coded signal to the computer 8a. The computer 8a interprets the coded signal as a corresponding software command. The commands are similar to those of a mouse, so that the pen 9 can be used to select, drag, and perform other actions on images projected on the planar surface 20.

Figure 15:
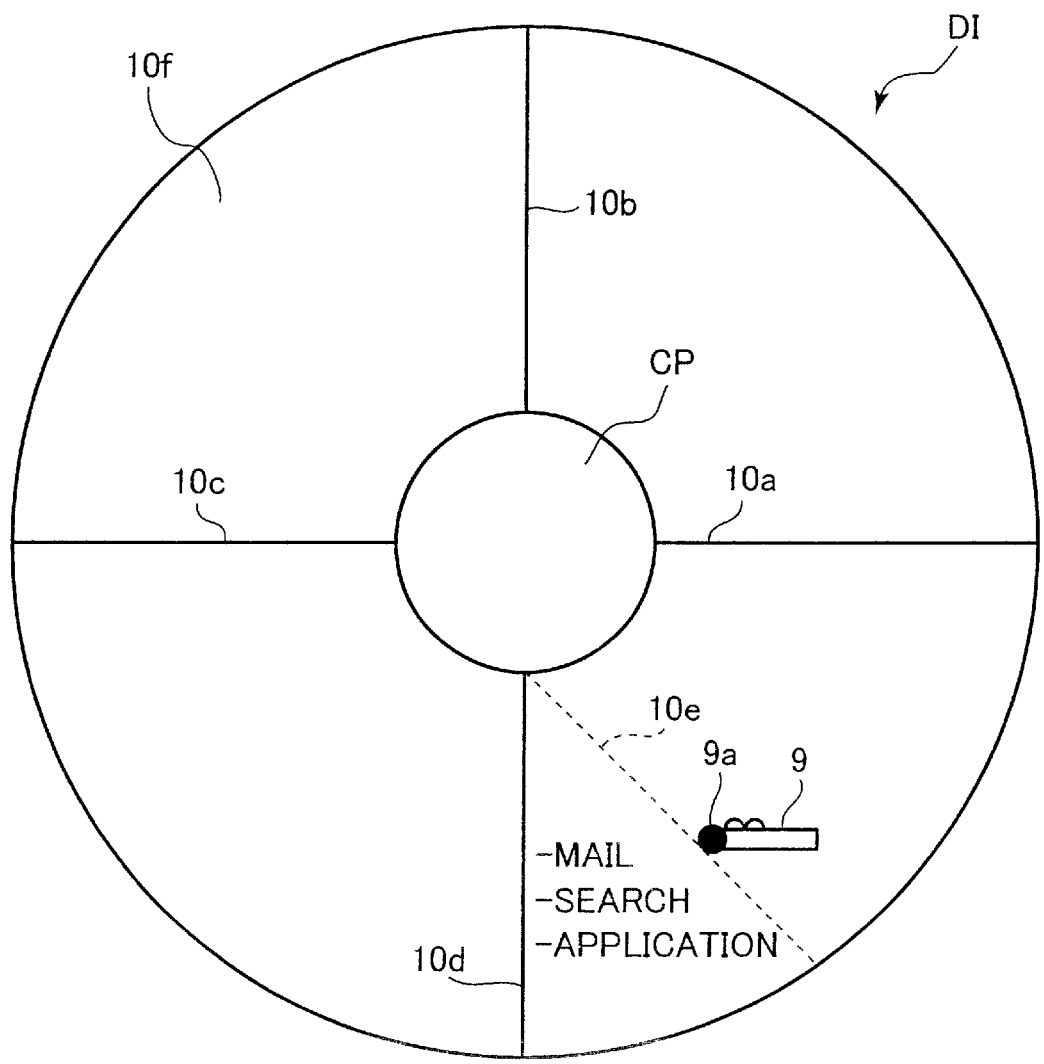
FIG. 15 is a plan view showing a door opened in the displayed image from a shadow produced in the displayed image by supports of the convex mirror.

For example, when the displayed image DI includes a hyperlink to a web page on the Internet, the user can click on the link using the pen 9 to control the computers 8a, 8b to access the web page. The computer 8a then controls the projector 3 to display the retrieved information as the displayed image DI. Also, as shown in FIG. 15, the displayed image DI on the planar surface 20 includes four shadows 10a–10d resulting from the supports 6. When the user presses the buttons 9b, 9c to initiate the drag function while the pen 9 is located over the shadow 10d, and moves the pen 9 away from the shadow 10d, then as shown in FIG. 15, a door 10e opens to expose various objects representing applications that the user can then start up using the pen 9. The door 10e can be closed by dragging in the opposite direction toward the shadow 10d. Further, as shown in FIG. 15, a networked area 10f is defined by adjacent shadows 10c, 10b. The networked area 10f displays objects and information from another computer connected to the computers 8a, 8b. Data can be transmitted from the other computer to the computers 8a, 8b by using the pen 9 to drag the corresponding object from the networked area 10f to an adjacent area. In the opposite manner, data can be transmitted from the computers 8a, 8b to the other computer by using the pen 9 to drag the corresponding object from an adjacent area to the networked area 10f.

Figure 16:
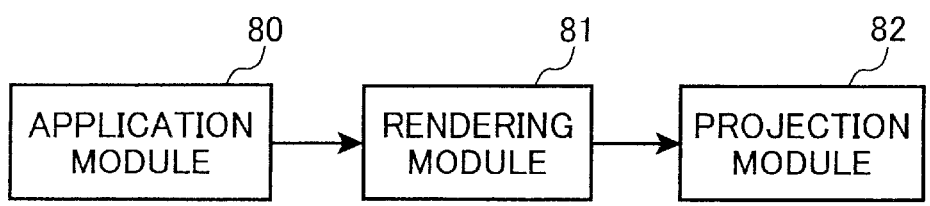
FIG. 16 is a schematic view showing modules for performing various functions of the system.

As shown in FIG. 16, the functions performed by the computers 8a, 8b can be represented as three modules: an application module 80, a rendering module 81, and a projection module 82. It should be noted that the computers 8a, 8b also include an operating system, which may or may not perform some or all of the operations of the application module 80. That is, the application module 80 might be broken down further into an operation system layer and an application layer.

Figure 17:
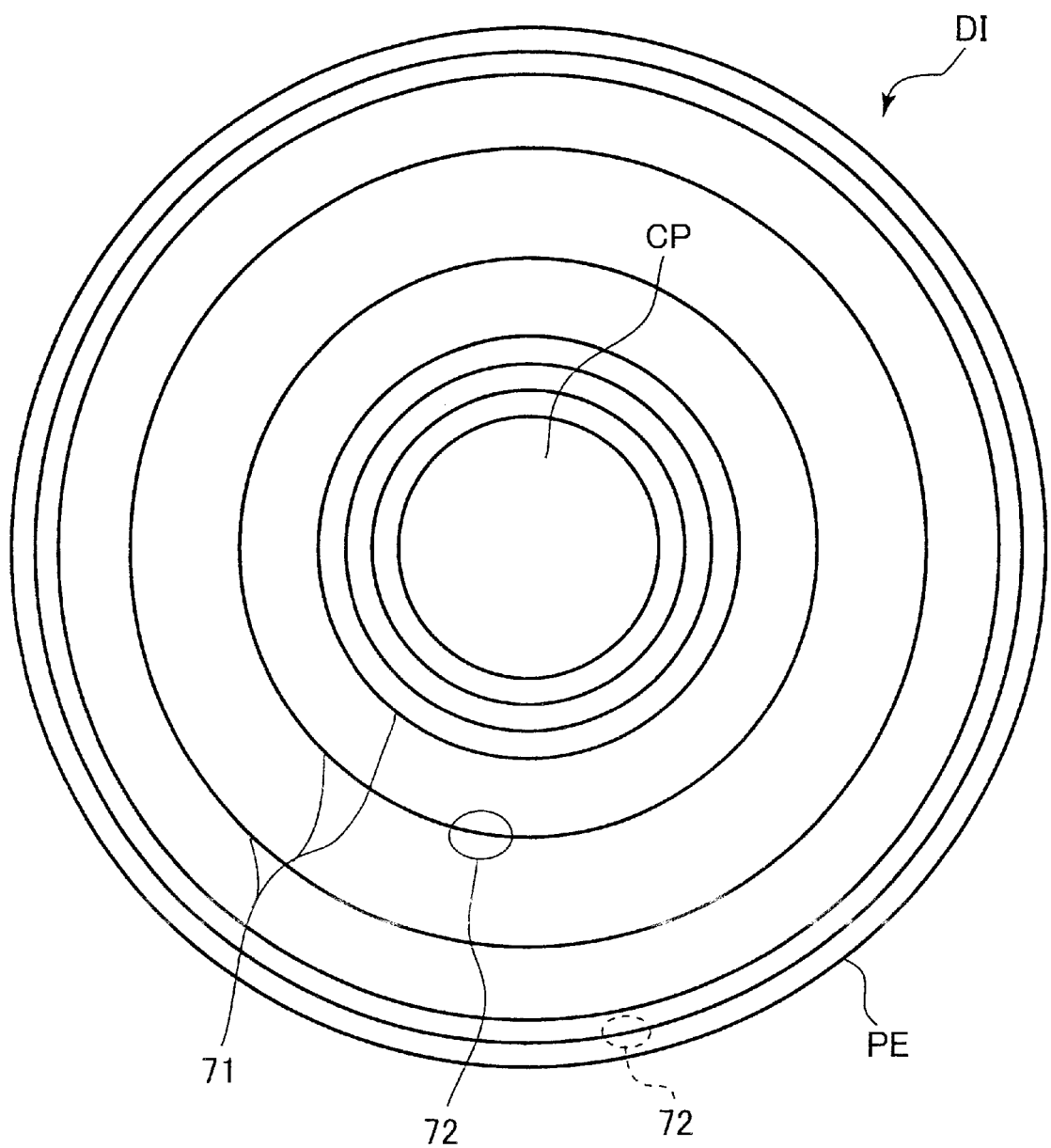
FIG. 17 is a plan view showing concentric rings in the displayed image.

The application module 80 executes the specific application, such as a game, web browsing, writing, or drawing. The application module 80 represents all objects based on a radial coordinate grid rather than a rectilinear co-ordinate system. The radial grid includes concentric rings 71 that are displayed in the displayed image DI as shown in FIG. 13. As shown in FIG. 17, the concentric rings 71 are closer together at portions corresponding to near the center portion CP and the perimeter edge PE of the displayed image DI. As a result, an object 72 will appear larger when centered between the center portion CP and the perimeter edge PE as indicated in solid line than when located near the center portion CP or the perimeter edge PE as indicated in dotted line. This allows the user to shrink objects by dragging them toward either the center portion CP or the perimeter edge PE, so that many objects can be located on the planar surface 20 at the same time. In one mode of the system 1, the concentric rings represent different times, that is, a concentric ring closer to the center portion CP represents earlier times and a concentric ring closer to the perimeter edge PE represents later times. Objects are attached to the concentric ring that corresponds to the time of their creation. The user can expand objects-created at certain times by dragging the corresponding concentric ring from the peripheral edge PE toward portion CP or from the center portion CP toward the perimeter edge PE.

Figure 18:
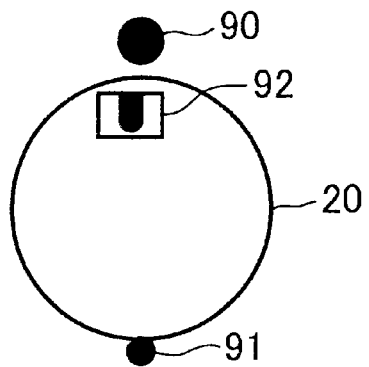
FIG. 18 is a schematic view showing how orientation of objects must be rotated when the object is moved from one side of the displayed image to the other.

In addition, the application module 80 changes the orientation angle of objects while moving the objects across the planar surface 20. The orientation angle represents the orientation of the object with respect to the outer perimeter of the planar surface 20. When the planar surface 20 is a horizontal surface, such as a table top, it can be assumed that users will encircle the table. As shown in FIG. 18, when two people 90, 91 sit on opposite sides of the table 20, an object 92 displayed in front of person 90 appears right-side up, but appears upside down to the other person 91. When the displayed object 92 is moved towards the other person 91, for example, by dragging using the pen 9, the object 92 rotates so as to be right-side up when directly in-front of the other person 91. All objects can be rotated simultaneously at once around the table 20 in the manner of a Chinese table where food can be easily passed to various people sitting around a circular table.

The rendering module 81 handles the unique aspect that images displayed for an application must appear within a circular frame. The rendering module 81 converts the coordinates of the radial coordinate system to a rectilinear coordinates system for display. Some aspects of the rendering module 81 can be implemented using hardware, such as graphics cards.

Displayed lines and other graphics appear sharp when aligned with the concentric rings 71 of the radial grid, but can appear jagged when rotated with respect to the radial grid. To prevent this problem, the rendering module 81 performs anti-aliasing on edges of objects. The anti-aliasing is performed most efficiently and quickly when implanted using hardware, but also be implemented using software.

The projection module 82 handles the final display of the application that is output to the projector 3. Because the image is projected onto the convex mirror 5, the image would appear distorted if not processed before being finally projected to the planar surface 20. To prevent this distortion, the image is texture mapped onto 3D concave model that is an exact opposite of the convex mirror 5. When the processed image is then reflected by the convex mirror 5, the distortion from the concave model is canceled out by the convex mirror 5 so that the image displayed on the planar surface 20 appears correct with no distortion. In other words, the concave 3D model and the real convex mirror 5 cancel each other out, resulting in the correct straight image.

Figure 19:
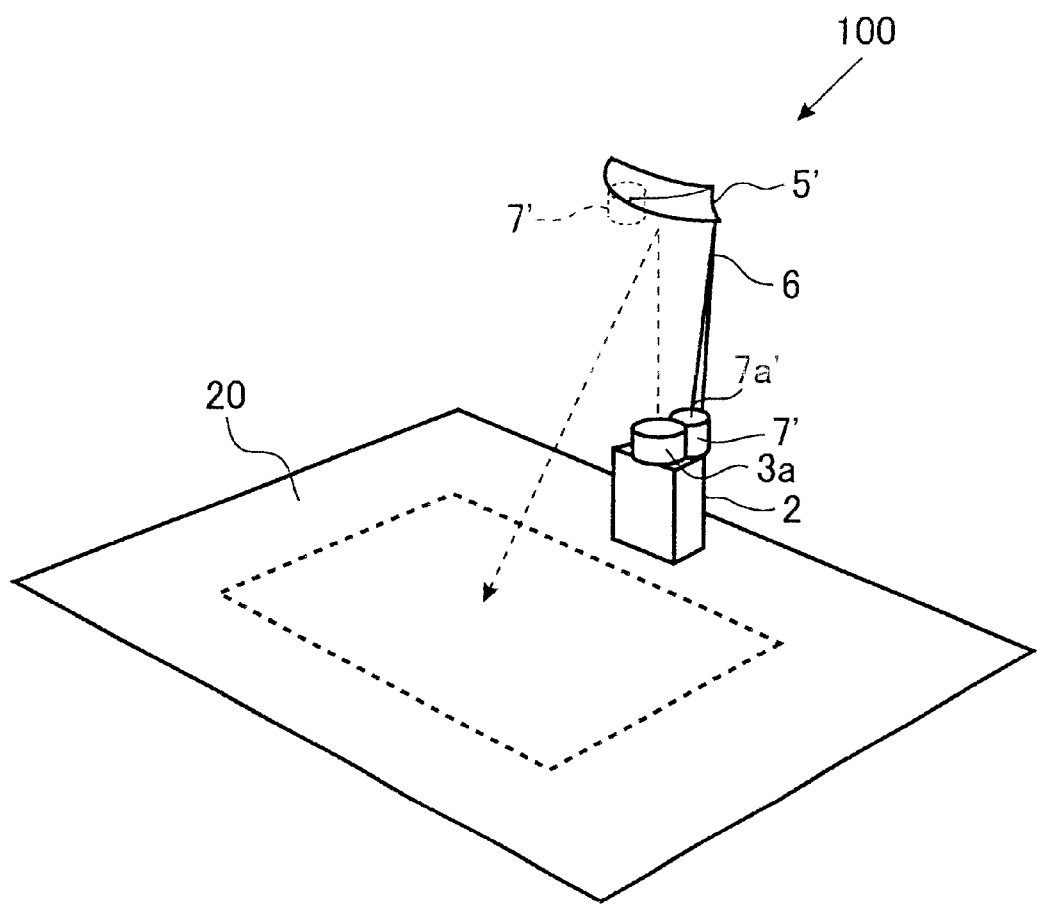
FIG. 19 is a perspective view showing an interactive projection system according to another embodiment of the present invention.

Next, an interactive projection system 100 according to a second embodiment will be described while referring to FIG. 19. Components of the system 100 that are the same as components of the system 1 of the first embodiment will be provided with the same numbering, and explanation omitted. The system 100 uses a mirror 5' that is shaped in a one-quarter wedge of a circle as viewed from the image projecting portion 3a. Because the mirror 5' is smaller than the mirror 5, the image displayed on the planar surface 20 is smaller overall image. The system 100 is more geared towards personal use, such as placed towards the back of a personal desk with the image projected in front of the user, and is sufficiently large to project a standard 4:3 aspect ratio computer display, such as, resolution 640:480 or 800:600. Also, a camera 7' is disposed on the base 2 with its image-pick-up portion 7a' facing the convex mirror 5', so that the image-pick-up portion 7a' picks up images reflected from the planar surface 20 onto the convex mirror 5'. The camera 7' serves the same functions as the camera 7 of the first embodiment. Because the convex mirror 5' is lighter than the convex mirror 5 of the first embodiment, and also because the camera 7' is mounted on the base 3 rather than on the mirror 5', only a single support 6 is needed. The cameral 7' could be mounted on the mirror 5' in a manner similar to the cameral 7 of the first embodiment, and still the mirror would require less support. Also, because the displayed image can be in a rectangular shape, the computers can use commercially available software with images based on a X,Y coordinates system, instead of a radial grid system. If display of a 16:9 aspect ratio is to be displayed, then it is desirable to use a larger mirror of one-half wedge of a circle as viewed from the image projecting portion 3a.

While the invention has been described in detail with reference to specific embodiments thereof, it would be apparent to those skilled in the art that various changes and modifications may be made therein without departing from the spirit of the invention, the scope of which is defined by the attached claims.

For example, the embodiments describe the invention as a table-top projection system that is compact and portable. However, the projection system could be any size and mounted to any planar surface such as a wall, ceiling, or floor.

Also, the infrared readers 10 could be integrated directly into the camera 7 so that the camera 7 can detect commands from the pen 9 and not just the position of the pen 9.

The functions of the application module, the rendering module, and the projection module can be performed by a single computer instead of the two computers 8a, 8b. in this case, it is desirable to house the single computer in the base 2 to make the system more compact and portable.

Although the embodiment described a single pen 9, multiple pens could be provided for enabling interaction by a group. In this case, the different pens could emit different patterns of infrared light to enable distinguishing which commands come from which pens.

Although the embodiment described that system 1 determines only the horizontal location of the pen 9, the system could be modified to determine the vertical (Z) position of the pen 9 with respect to the planar surface 20. For example, four further cameras could be provided at the base 2 to detect the position of the pen 9 from each side of the base 2. The output from the four cameras in addition to the output from the camera 7 could be used to calculate the height of the pen 9 using triangulation, in the same manner that three satellites are used to determine the position and altitude of a GPS unit.

Although the embodiment describes the system 1 as recognizing input of commands from the pan 9, the system could be modified to recognize commands in other ways. For example, an image recognition software could be used to perform real-time analysis of images from the camera to detect hand gestures as shapes that represent different commands. For example, a single extended finger could represent a drag function and two extended fingers could represent a double click. Alternately, the system could be modified to recognize various objects, colors (reflected light), or two-dimensional barcodes as different commands. Also, the pen could be provided in a ring-shape worn on the user's finger.

What is claimed is:

1. An interactive projection system for displaying an image on a planar surface, the system comprising:

a projector housed in a base, the projector having an image projecting portion that projects an image along a projection path away from the projector;

a convex mirror;

at least one support connected to the base and supporting the convex mirror at a position along the projection path so as to face the image projecting portion;

a position indicator for indicating a position on the planar surface;

a camera mounted on the base and having an image-pick-up portion facing the convex mirror, the camera detecting the position indicated by the position indicator as reflected from the convex mirror; and a processor for determining positional relationship of the position indicated by the position indicator and the displayed image on the planar surface, and controlling the projector to include a cursor in the image at the position indicated by the position indicator.

2. An interactive projection system as claimed in claim 1, wherein the convex mirror is shaped in a ¼ wedge of a circle as viewed from the image projecting portion.

3. An interactive projection system as claimed in claim 1, wherein the position indicator includes:

an infrared emitter for emitting infrared light to indicate the position; and an infrared lens covering the image-pick-up portion of the camera.

4. An interactive projection system as claimed in claim 1, further comprising:

an infrared emitting unit for emitting infrared light in a plurality of patterns;

at least one infrared sensor for detecting the infrared light emitted by the infrared light emitting unit; and a processor for determining light pattern or the infrared light detected by the infrared sensor and for performing a process that corresponds to the light pattern.

5. An interactive projection system as claimed in claim 1, wherein the convex mirror comprises a substantially torus-like shape with a center hole as viewed from the image projecting portion, wherein the projector projects a torus shaped image with objects and concentric rings, objects on a ring displayed in a different size from objects on another ring, wherein the processor is controlled by changes on the torus shaped image, the changes being detected by the image-pick-up portion of the camera.

6. An interactive projection system for displaying an image on a planar surface, the system comprising:

a projector housed in a base, the projector having an image projecting portion that projects an image along a projection path away from the projector;

a convex mirror;

at least one support connected to the base and supporting the convex mirror at a position along the projection path so as to face the image projection portion;

a position indicator for indicating a position on the planar surface;

a camera mounted on the convex mirror and having an image-pick-up portion facing the displayed image on the planar surface, the camera detecting the position indicated by the position indicator; and a processor for determining positional relationship of the position indicated by the position indicator and the displayed image on the planar surface, and controlling the projector to include a cursor in the image at the position indicated by the position indicator.

7. An interactive projection system as claimed in claim 6, wherein the position indicator includes:

an infrared emitter for emitting infrared light onto the image on the planar surface; and an infrared lens covering the image-pick-up portion of the camera.

8. An interactive projection system as claimed in claim 6, further comprising:

a convex mirror shaped substantially like a torus with a center hole as viewed from the image projecting portion;

a camera having an image-pick-up portion facing the image projection portion of the projector through the center hole of the convex mirror, the camera detecting the position indicated by the position indicator; and a processor for determining positional relationship of the position indicated by the position indicator and the image from the image projecting portion of the projector on the planar surface, and controlling the projector to include a cursor in the image at the position indicated by the position indicator.

9. An interactive projection system as claimed in claim 8, wherein the position indicator includes:

an infrared emitter for emitting infrared light to indicate the position; and an infrared lens covering the image-pick-up portion of the camera.

10. An interactive projection system as claimed in claim 8, wherein the at least one support includes a plurality of supports disposed substantially equidistance from each other external from the convex mirror so as to block the image reflected from the projection path off the convex mirror and produce shadows in the image displayed on the planar surface.

11. An interactive projection system as claimed in claim 10, wherein the processor controls the projector to display an opening door in the image when the processor determines that the position indicator is moved from a position on one of the shadows to a position away from the shadow, and controls the projector to display objects within the door.

12. An interactive projection system as claimed in claim 10, wherein two adjacent shadows define a networked area within the displayed image.

13. An interactive projection system for displaying an image, the system comprising:

a base disposed on the planar surface;

a projector housed in the base, the projector having an image projecting portion that projects an image along a projection path away from the projector;

a convex mirror shaped in a full circle with a center hole as viewed from the image projection portion; and at least one support connected to the base and supporting the convex mirror at a position along the projection path so as to face the image projecting portion of the planar surface;

a position indicator for indicating a position of the image projecting portion of the planar surface;

a camera mounted on the base and having an image-pick-up portion facing the convex mirror, the camera detecting the position indicated by the position indicator as reflected from the convex mirror; and a processor for determining positional relationship of the position indicated by the position indicator and the displayed image on the planar surface, and controlling the projector to include a cursor in the image at the position indicated by the position indicator; wherein said the displayed image appears in a circular torus shape of the image projection of the planar surface.

* * * * *